United States Patent [19]
Kamiya et al.

[11] Patent Number: 4,772,303
[45] Date of Patent: Sep. 20, 1988

[54] PROCESS FOR FABRICATING OPTICAL FIBER

[75] Inventors: Tamotsu Kamiya; Yasuhiro Shibayama; Nobuhito Uchiyama; Noboru Sato, all of Ichihara, Japan

[73] Assignee: The Furukawa Electric Co., Ltd., Tokyo, Japan

[21] Appl. No.: 877,854

[22] Filed: Jun. 24, 1986

[30] Foreign Application Priority Data

Jun. 25, 1985 [JP] Japan .................. 60-138754
Jul. 5, 1985 [JP] Japan .................. 60-148067

[51] Int. Cl.$^4$ .............................. C03B 37/023
[52] U.S. Cl. ............................ 65/3.12; 65/2; 65/13
[58] Field of Search ............ 65/2, 3.11, 3.12, 13, 65/29, 32, DIG. 900

[56] References Cited

U.S. PATENT DOCUMENTS

| | | | |
|---|---|---|---|
| 4,155,733 | 5/1979 | Sandbank et al. | 65/3.12 |
| 4,157,906 | 6/1979 | Bailey | 65/DIG. 900 |
| 4,277,270 | 7/1981 | Krohn | 65/13 X |
| 4,389,229 | 6/1983 | Jang et al. | 65/3.12 |
| 4,486,212 | 12/1984 | Berkey | 65/2 |
| 4,636,235 | 1/1987 | Glessner et al. | 65/3.12 |
| 4,636,236 | 1/1987 | Glessner et al. | 65/3.12 |

*Primary Examiner*—Robert L. Lindsay
*Attorney, Agent, or Firm*—Foley & Lardner, Schwartz, Jeffery, Schwaab, Mack, Blumenthal & Evans

[57] ABSTRACT

A process for fabricating an optical fiber by inner-lining a quartz tube with synthetic glass having a refractive index higher than the quartz tube and collapsing it while wire-drawing it via a wire-drawing furnace, comprising the steps of inner-lining the synthetic glass in the quartz tube so that the value of the inner diameter/the outer diameter of the quartz tube is 0.85 or less, sealing one end of the quartz tube to form a sealed end, then holding the quartz tube in a wire-drawing furnace, and wire-drawing it from the sealed end while holding the internal pressure of the quartz tube in negative pressure. Thus, the process prevents moisture from the exterior from mixing and allows the wire-drawing and collapsing steps to be performed stably and reliably.

4 Claims, 3 Drawing Sheets

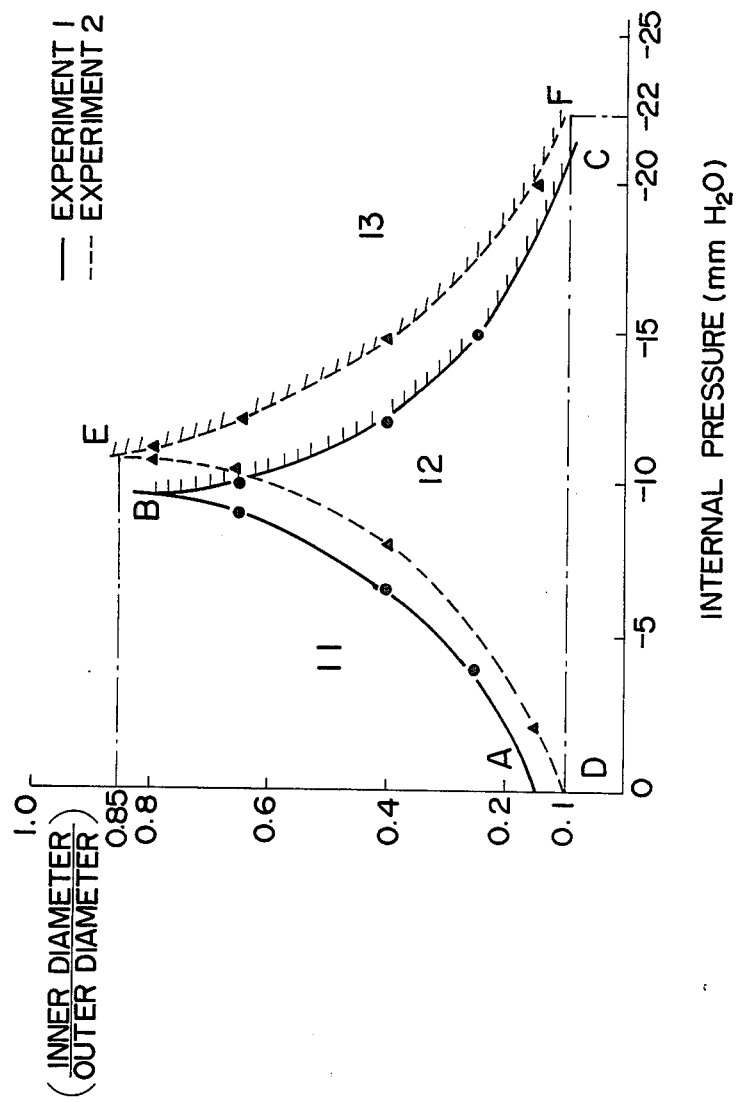

PROCESS FOR FABRICATING OPTICAL FIBER

BACKGROUND OF THE INVENTION

This invention relates to a process for producing an optical fiber by a modified CVD method (MCVD method).

Heretofore, known is a process for producing an optical fiber which has the steps of inner-lining a quartz tube with synthetic glass having a refractive index higher than the quartz tube to form a portion, ordinarily called "a core" and, wire drawing it via a wire-drawing furnace while simultaneously collapsing it. For example, the conventional process is disclosed in U.S. Pat. No. 3,711,262. The prior invention utilizes the steps of heating a quartz tube at a high temperature at wire-drawing time to soften it and contracting it by its surface tension, thereby providing an advantage that the production efficiency is high due to the simultaneous steps of wire-drawing and collapsing it.

However, according to the conventional process, the heating conditions required for collapsing it and the heating conditions necessary for wire-drawing do not always coincide. As a result, there arise various drawbacks that the central portion of the optical fiber is not solidified, so-called "an incomplete collapsing" or its circularity in case of solidifying is deteriorated to cause it to be deformed so that the collapsing step becomes unstable. Further, when the heating conditions of collapsing is preferentially prepared, another drawback that the wire-drawing conditions are restricted, takes place.

In addition, the quartz tube made by forming a core in the tube as described above is hollow in the center, and moisture in the atmosphere is mixed in case of wire-drawing, the moisture is introduced into the optical fiber at the time of wire-drawing to cause the transmission loss of the optical fiber to increase.

SUMMARY OF THE INVENTION

Accordingly, an object of this invention is to provide a process for fabricating an optical fiber for simultaneously wire-drawing and collapsing which can eliminate the aforementioned drawbacks and disadvantages, and can prevent moisture from the exterior from mixing and can reliably and stably performing both the wire-drawing and collapsing steps.

In order to achieve the above and other objects of this invention, there is provided a process for fabricating an optical fiber by inner-lining a quartz tube with synthetic glass having a refractive index higher than the quartz tube and collapsing it while wire-drawing it via a wire-drawing furnace, comprising the steps of inner-lining the with synthetic glass quartz tube so that the value of the inner diameter/the outer diameter of the quartz tube is 0.85 or less, then sealing one end of the quartz tube to form a sealed end, then holding the quartz tube in a wire-drawing furnace, and wire-drawing it from the sealed end while holding the internal pressure of the quartz tube in negative pressure.

The above and other related objects and features of the invention will be apparent from a reading of the following description of the desclosure found in the accompanying drawings and the novelty thereof pointed out in the appended claims.

BRIEF DESCRIPTION OF THE PREFERRED

FIG. 3 is a graph illustrating the fabricating conditions of the process of the invention.

Figure 1:
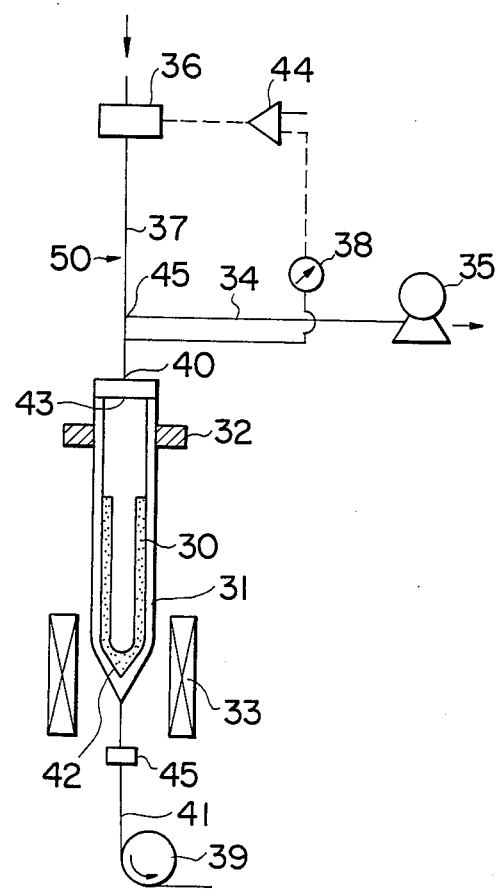
FIG. 1 is a schematic view showing a first embodiment of a process for fabricating an optical fiber according to the present invention.

Embodiments of a process for fabricating an optical fiber according to the present invention will be described in detail with reference to the accompanying drawings. FIG. 1 is a schematic view showing a first embodiment of the present invention. As shown in FIG. 1, in the process of the present invention, a synthetic glass layer 30 having a refractive index higher than a quartz tube 31 is inner-lined inside the quartz tube 31, for example, by an MCVD method so that the value of the inner diameter/the outer diameter of the quartz tube 31 is 0.85 or less (here, the inner diameter means the inner diameter of the synthetic glass layer 30). Then, one end of the quartz tube 31 is sealed to from a sealing end 42. Subsequently, the quartz tube 31 is held by a support 32 in a wire-drawing furnace 33, and a suction system 50 is connected through a connector 40 to the open end 43 of the other end of the quartz tube 31. Here, the suction system 50 has, as shown in FIG. 1, conduits 34, 37, a suction pump 35 connected to the conduits 34, 37, and a gas feeding flow rate regulator 36. The suction system 50 further has a differential pressure gauge 38 mounted in the conduit between the joint 45 of the conduits 34 and 37 and the connector 40, and a setter 44 connected to the pressure gauge 38 for setting the gas flow amount of inert gas or the like by the indicated pressure value and controlling the flow rate regulator 36.

Thus, after the quartz tube 31 and the suction system 50 are connected, they are evacuated in the predetermined suction by the pump 35, the gas flow rate is regulated by the regulator 36 for introducing the gas while detecting the internal pressure in the quartz tube 31 by the pressure gauge 38, and the pressure in the tube 31 is maintained at predetermined negative pressure. For reasons described in more detail below, the negative pressure is optimum at 0 to $-22$ mmH$_2$O, it being understood that the range 0 to 22 mm H$_2$O refers to the amount, in mm H$_2$O, by which the pressure is reduced below one atmosphere.

When this state is stabilized, an optical fiber 41 is drawn from the sealing end 42 of the quartz tube 31. Numeral 45 designates a coating unit for coating on the optical fiber 41, and numeral 39 designates a capstan used to draw the optical fiber.

The control of the internal pressure in the quartz tube 31 may be performed, for example, by providing an automatic switching valve before the pump 35, controlling the opening of the valve through a setter for operating by the indicated value of the differential pressure gauge, or using a suction pump for regulating the suction amount by a frequency conversion, but when the internal pressure to be controlled is ultrafine value like 0 to $-22$ mmH$_2$O, it is convenient to allow the suction pump 35 to always suck the predetermined amount, as shown, and to regulate the gas flow amount from the exterior by the regulator 35 through the setter 44. Thus, even if an unstable cause such as pulsation occurs in the pump 35, ultrafine pressure can be effectively regulated conveniently.

In the first embodiment in FIG. 1 described above, as halogen gas such as chlorine gas, further halogen gas containing no hydrogen gas such as Freon gas or thionyl chloride may be introduced via the regulator 36 and the pressure in the quartz tube 31 is regulated in the gas atmosphere, it can also prevent the moisture in the atmosphere from invading, and can preferably remove the moisture in the quartz tube 31 more efficiently.

Figure 2:
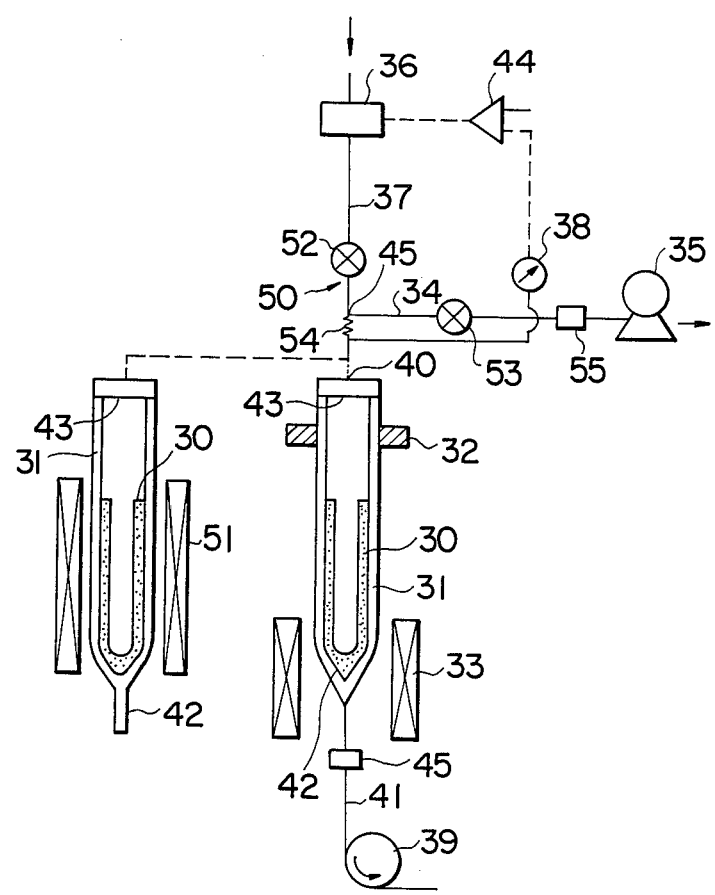
FIG. 2 is a schematic view showing a second embodiment of a process according to the present invention.

FIG. 2 shows a second embodiment of the process according to the present invention. FIG. 2 shows an embodiment in which dehumidifying process is conducted before the process in FIG. 1. A synthetic glass layer 30 having a refractive index higher than the quartz tube 31 is lined in the quartz tube 31, one end of the quartz tube 31 is sealed to form a sealing end 42, a suction system 50 is then hermetically connected to the open end 43 of the quartz tube 31, and the quartz tube 31 is evacuated by a suction pump 35 while heating by a heating furnace 51 in a range, for example, of 100° C. to 500° C. The reason why the upper limit of the heating temperature is limited to 500° C. is because, if the limiting temperature is higher than 500° C., the moisture reacts with the quartz so that the moisture is, on the contrary, introduced into the quartz. Since it is not necessary to regulate the pressure in the quartz tube 31 in case of the previous process, a valve 52 is provided between the joint 45 of the suction system 50 and the flow rate regulator 36 shown in FIG. 1, and the quartz tube 31 is evacuated by closing the valve. Here, numeral 53 designates a valve provided between the joint 45 and the suction pump 35, which is naturally opened during the suction by the suction pump 35. When a trap 55 is provided between the valve 53 and the suction pump 35, it can prevent the pump 35 from being corroded by the corrosive gas, and can simultaneously prevent preferably reverse gas flow from flowing from the suction pump 35 side, but this is not indispensable.

As described above, when the quartz tube 31 is dehumidified completely, the valve 52 is opened, the valve 53 is closed, halogen gas described with respect to FIG. 1 is then introduced from the exterior into the quartz tube 31 via the flow rate regulator 36, and the quartz tube 31 is moved to the wire-drawing furnace 33 side in the state that the quartz tube 31 is filled with the gas. A flexible pipe designated by numeral 54 may be conveniently provided at part of the connection of the joint 45 and the open end 43 of the quartz tube 31 so as to facilitate the movement of the quartz tube.

Thus, after the quartz tube 31 is moved to the wire-drawing furnace 33 side, the valve 53 is opened, and the same operation as described with respect to FIG. 1 is conducted to wire-draw.

Then, as described above, the reason why the value of the inner diameter/the outer diameter of the quartz tube 31 is set to 0.85 or less and the reason why the internal pressure to be controlled is optimally at 0 to $-22$ mmH$_2$O will be described.

When the quartz tube 31 is generally evacuated in negative pressure or vacuum, a force is acted in the collapsing direction to the quartz tube by the differential pressure between the interior and the exterior of the quartz tube. The prime power of the collapse is ordinarily the surface tension of melted glass, but if the differential pressure is produced between the exterior and the interior of the quartz tube as described above, the quartz tube 31 may be more readily collapsed. However, if this differential pressure is excessively large, since the collapsing step of the quartz tube 31 itself is unstable, the quartz tube 31 might be deformed to noncircular shape. Therefore, the differential pressure should have a restricted range. This value is affected by the influence of the size of the quartz tube 31, and particularly the value of the inner diameter/the outer diameter and the viscosity of the quartz tube 31. Naturally, the smaller the value of the inner diameter/the outer diameter is, the smaller the size of the hollow portion in the quartz tube is. Accordingly, the contraction rate of the quartz tube 31 in case of collapsing is smaller, and the quartz tube 31 having less deformation can be readily provided. Consequently, even if the differential pressure is low, the collapsing step can be performed, while even if the differential pressure is, on the contrary, excessively high, the quartz tube is not so deformed. More particularly, the range of the differential pressure of the quartz tube can be increased. On the one hand, in the case when the value of the inner diameter/the outer diameter is large, since the contraction rate is large, if the differential pressure is excessively low, the quartz tube is hardly collapsed, while if the differential pressure is excessively high, the quartz tube may be readily deformed. In other words, the range of the suitable differential pressure is narrowed. On the other hand, the viscosities of both the quartz tube 31 and the synthetic glass layer 30 affect the range of the differential pressure. As to the quartz tube 31, in case of the ordinary quartz glass tube, its viscosity depends upon the content of OH group, and if the content becomes less, the viscosity becomes larger. On the other hand, as to the synthetic glass layer 30 of the inner layer, if various dopants are added to the SiO$_2$, its viscosity decreases, and its degree is proportional to the amount of the dopant. In the quartz tube having small viscosity, the tube may be readily collapsed and also deformed. Therefore, if the values of the inner diameter/the outer diameter are equal, the differential pressure depends upon the smaller one. On the other hand, if the viscosity increases, the quartz tube may hardly be deformed, and hardly be collapsed. Thus, if the values of the inner diameter/the outer diameter are the same, the differential pressure depends upon the larger one. The following experiments have been executed so as to determine the value of the inner diameter/the outer diameter as well as the differential pressure range according to the above-mentioned prerequisite.

EXPERIMENT 1

A synthetic glass layer 30 of SiO$_2$ added with 1 mol-% of P$_2$O$_5$ was inner lined on the inner surface of a natural quartz tube 31 of the content (water content) of OH group of approx. 200 ppm having small viscosity in such a manner that the section area ratio was 3.3:1.0, and several types of different inner diameter/outer diameter were prepared. They were heated at approx. 2100° C. in a wire-drawing furnace 33 to provide an optical fiber 41 having 125 micrometers of outer diameter. At this time, the internal pressure of the quartz tube 31 was up to 0 mmH$_2$O, and evacuated gradually to negative pressure, and sampled every time, and the shape was measured at every time. The wire-drawing velocity was approx. 80 m/min, and the wire-drawing tension was approx. 10 g. The result became a solid line A-B-C in FIG. 3. Here, the outside (11) of A-B had uncollapsed portion in the quartz tube 31, and the outside (13) of B-C has the portion including large deformation unavailable for use, and the inside (12) of A-B-C had no uncollapsed portion nor deformation, being preferable.

EXPERIMENT 2

A synthetic glass layer 30 of pure $SiO_2$ was inner lined on the inner surface of a unhydrate quartz tube 31 of the content (water content) of OH group of approx. 1 ppm having large viscosity in such a manner that the sectional area ratio was 3.3:1.0, and several types of different inner diameter/outer diameter were prepared. An optical fiber 41 having 125 micrometers of an outer diameter was provided in the same manner as the EXPERIMENT 1. At this time, the internal pressure of the quartz tube 31 was up to 0 $mmH_2O$, and evacuated gradually to negative pressure, and sampled every time, and the shape was measured at every time. The result became a broken line D-E-F in FIG. 3. Here, the outside (11) of D-E had uncollapsed portion in the quartz tube 31, and the outside (13) of E-F has the portion including large deformation unavailable for use, and the inside (12) of D-E-F had no uncollapsed portion nor deformation, being preferable.

As shown in FIG. 3, when the value of the inner diameter/the outer diameter of the quartz tube 31 is 0.85 or less and the internal pressure is 0 to $-22$ $mmH_2O$, stably wire-drawing and collapsing can be simultaneously performed. If the value of the inner diameter the outer diameter of the quartz tube 31 is 0.1 or less, the hollow portion of the tube 31 is very small, so that the effect of this invention is very small in the range of 0.1 or less.

According to the present invention as described above, in case of simultaneously wire-drawing and collapsing, the process can prevent moisture from invading from the exterior and provide the optical fiber having no deformation, i.e., high quality.

What is claimed is:

1. A process for fabricating an optical fiber, comprising the steps of inner-lining a quartz tube with synthetic glass having a higher refractive index than the quartz tube so that the ratio of the inner diameter of the synthetic glass lining to the outer diameter of the quartz tube is not greater than about 0.85, sealing one end of the quartz tube to form a sealed end and an open end of the quartz tube, and then drawing the quartz tube axially in a wire-drawing furnace from the sealed end, wherein the internal pressure used for a given ratio of inner diameter to outer diameter is selected in accordance with the family of curves defined in FIG. 3.

2. The process according to claim 1, wherein said negative pressure maintaining step comprises sucking gas in said quartz tube by a suction pump from the open end of said quartz tube to control the internal pressure therein.

3. The process according to claim 2, further comprising the step of regulating the flow of gas between the open end of said quartz tube and the suction pump to thereby regulate the internal pressure in said quartz tube.

4. A process according to claim 1, wherein a negative internal pressure is maintained in the quartz tube sufficient to facilitate uniform collapsing of the tube due to pressure differential between the interior and exterior of the quartz tube.

* * * * *